US012776905B2

(12) United States Patent
Kumaresan et al.

(10) Patent No.: US 12,776,905 B2
(45) **Date of Patent: *Oct. 27, 2026**

(54) CONDITIONAL OFFLINE INTERACTION SYSTEM AND METHOD

(71) Applicant: Visa International Service Association, San Francisco, CA (US)

(72) Inventors: Ranjit Kumaresan, Fremont, CA (US); Mahdi Zamani, Mercer Island, WA (US); Srinivasan Raghuraman, Cambridge, MA (US); Mihai Christodorescu, Belmont, CA (US); Mohammad Mohsen Minaei Bidgoli, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/034,286

(22) Filed: Jan. 22, 2025

(65) Prior Publication Data

US 2025/0175331 A1 May 29, 2025

Related U.S. Application Data

(63) Continuation of application No. 17/860,553, filed on Jul. 8, 2022, now Pat. No. 12,238,209, which is a (Continued)

(51) Int. Cl.

| | |
|---|---|
| ***H04L 9/08*** | (2006.01) |
| ***H04L 9/32*** | (2006.01) |
| ***H04L 9/40*** | (2022.01) |

(52) U.S. Cl.
CPC ............ *H04L 9/088* (2013.01); *H04L 9/3263* (2013.01)

(58) Field of Classification Search
CPC ..... H04L 9/088; H04L 9/3263; H04L 9/3247; H04L 63/0823

(Continued)

(56) References Cited

U.S. PATENT DOCUMENTS

2020/0351657 A1* 11/2020 Wentz .................. H04L 9/3231
2025/0233763 A1* 7/2025 Larraia ................. H04L 9/3013

OTHER PUBLICATIONS

Franceschini âA Guide to Zero Knowledge Proofsâ, Medium, Apr. 21, 2023, 34 pages, retrieved from https://medium.com/@Luca_Franceschini/a-guide-to-zero-knowledge-proofs-f2ff9e5959a8 (Year: 2023).*

(Continued)

*Primary Examiner* — James D Nigh
(74) *Attorney, Agent, or Firm* — Kilpatrick Townsend & Stockton LLP

(57) ABSTRACT

A method includes receiving, from a second user device, an interaction message comprising an amount and a condition, and a witness. The method also includes verifying an identify of the second user device, and the interaction message by determining that the witness satisfies the condition. Responsive to verifying the interaction message, the method includes adjusting an online balance for the second user device, generating a response message that indicates that the interaction message was successfully evaluated and the amount was added to the online balance, and transmitting the response message to the second user device.

20 Claims, 7 Drawing Sheets

Related U.S. Application Data continuation-in-part of application No. 16/834,954, filed on Mar. 30, 2020, now Pat. No. 11,556,909.

(60) Provisional application No. 63/220,089, filed on Jul. 9, 2021, provisional application No. 62/888,326, filed on Aug. 16, 2019.

(58) Field of Classification Search
USPC .......................................................... 713/171
See application file for complete search history.

(56) References Cited

OTHER PUBLICATIONS

Bentov et al. reference (âHow to Use Bitcoin to Design Fair Protocolsâ, Feb. 19, 2014, 38 pages) (Year: 2014).*
https://crypto.com/us/glossary/witness: definition retrieved from the interent, Jan. 26, 2026 (Year: 2026).*
SG11202201140S , "Written Opinion", Jan. 8, 2025, 7 pages.
CN202080057811.9 , "Office Action", Aug. 29, 2025, 8 pages.
CN202080057811.9, "Office Action", May 23, 2025, 6 pages.
EP20855215.8, "Office Action", Jul. 22, 2025, 11 pages.

* cited by examiner

CONDITIONAL OFFLINE INTERACTION SYSTEM AND METHOD

CROSS-REFERENCES TO RELATED APPLICATIONS

The present application is a continuation application of U.S. application Ser. No. 17/860,553, filed on Jul. 8, 2022, which is a continuation-in-part of U.S. application Ser. No. 16/834,954 filed on Mar. 30, 2020, which claims priority to U.S. Provisional Application No. 62/888,326 filed on Aug. 16, 2019. This application is also a Non-Provisional application of and claims priority to U.S. Provisional Application 63/220,089, filed on Jul. 9, 2021. All of the above applications are incorporated herein by reference in their entirety.

BACKGROUND

Digital interactions traditionally rely on online communications with several intermediaries to authorize and process interactions. While these intermediary networks are usually designed to be highly available, they may still become unreachable for users with unreliable network connections, resulting in exclusion and loss.

Further, if a first user operating a first user device performs an interaction with a second user operating a second user device to obtain a resource, the first user may not have assurance that the second user will provide the resource or fulfill any other condition to the interaction. This can be particularly true when the first user device and the second user device are offline.

Embodiments of the disclosure address these problems and other problems individually and collectively.

SUMMARY

One embodiment is related to a method comprising: receiving, by a server computer from a second user device, an interaction message comprising an amount and a condition, and a witness; verifying, by the server computer, an identify of the second user device; verifying, by the server computer, the interaction message by determining that the witness satisfies the condition; responsive to verifying the interaction message, adjusting, by the server computer, an online balance for the second user device; generating, by the server computer, a response message that indicates that the interaction message was successfully evaluated and the amount was added to the online balance; and transmitting, by the server computer, the response message to the second user device.

Another embodiment is related to a method comprising: receiving, by a server computer from a second user device, an appeal request message comprising an indication that a first user device has not properly provided a signed witness and requests an appeal of an interaction involving the first user device, the second user device and an interaction message comprising an amount and a condition; responsive to receiving the appeal request message, determining, by the server computer, a random nonce; transmitting, by the server computer to the second user device, the random nonce; receiving, by the server computer from the second user device, an appeal interaction message comprising the interaction message, a witness, and the random nonce; evaluating, by the server computer, the interaction message and the witness; and providing, by the server computer to the second user device, an appeal interaction response message comprising an indication of whether or not the appeal was successful.

Another embodiment is related to a method comprising: receiving, by a server computer from a first user device, a reversal interaction message to reverse an interaction between the first user device and a second user device; obtaining, by the server computer, a random nonce; transmitting, by the server computer to the first user device, the random nonce; receiving, by the server computer from the first user device, a reverse interaction message comprising an interaction message and a log entry; evaluating, by the server computer, the interaction message and the log entry; generating, by the server computer, an appeal response message that indicates whether or not the reversal was successful from the server computer; and transmitting, by the server computer to the first user device, the appeal response message.

Further details regarding embodiments of the disclosure can be found in the Detailed Description and the Figures.

DETAILED DESCRIPTION

Figure 1:
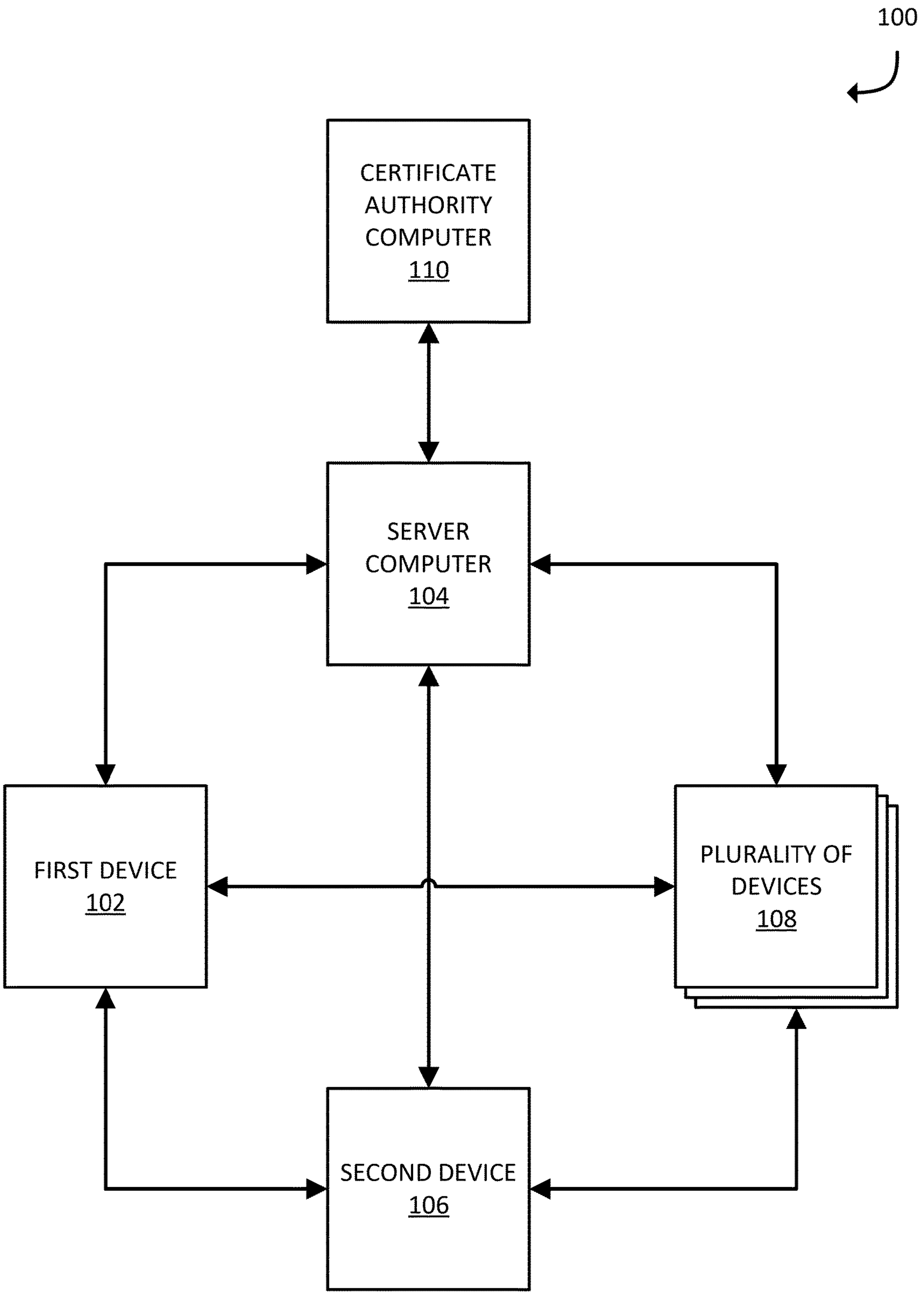
FIG. 1 shows a block diagram of conditional offline interaction system according to embodiments.

Prior to discussing embodiments of the disclosure, some terms can be described in further detail.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin client device, a tablet PC, etc. Additionally, user devices may be any type of wearable technology device, such as a watch, earpiece, glasses, etc. The user device may include one or more processors capable of processing user input. The user device may also include one or more input sensors for receiving user input. There are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user" may include an individual. In some embodiments, a user may be associated with one or more personal accounts and/or mobile devices. The user may also be referred to as a cardholder, account holder, or consumer in some embodiments. In some embodiments, a resource provider can be a user and may operate a user device.

A "secure element" can include an element that is secure. A secure element can include a cryptographically secure computer-on-a-chip or microprocessor. A secure element can carry out cryptographic operations and may be embedded in a packaging with one or more physical security measures. In some embodiments, a secure element can include a component that can perform a function securely. A secure element may be a memory that securely stores data, such that its access is protected. A secure element can include a trusted execution environment on a secure area of a processor. An example of a secure element is a universal integrated-circuit card (UICC). Another example of a secure element is an embedded secure element, an embedded hardware component in a larger mechanical or electrical system. Another example of a secure element is a hardware security module (HSM), which is a physical computing device that can safeguard and manage cryptographic keys for authentication and provide crypto-processing functions.

A "trusted execution environment" (TEE) can include a secure area. A trusted execution environment can be a software stack stored on a read-only memory (ROM). A trusted execution environment can be included within a secure element. A trusted execution environment software stack can include of a set of resources to access the secure element, a trusted operating system (TOS) that provides a developer access to the underlying secure element, and one or more trusted applications (TA) that implement application-specific functionalities within the trusted application environment.

In some embodiments, a trusted execution environment can be an isolated execution environment that provides security features such as isolated execution, integrity of applications executing with the trusted execution environment, along with confidentiality of their assets. A trusted execution environment can offer an execution space that provides a higher level of security for trusted applications running on the device than a rich operating system and more functionality than a secure element alone.

A "trusted application" can include an application that is implemented within a trusted execution environment. A trusted application may perform specific functionalities. A trusted application can be paired with an application-specific client application (CA) that resides outside of the isolated trusted execution environment space and provides user-facing functionalities by interacting with the trusted application through the trusted operating system.

An "access device" may be any suitable device that provides access to a remote system. An access device may also be used for communicating with a coordination computer, a communication network, or any other suitable system. An access device may generally be in any suitable location, such as at the location of a merchant. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), vending machines, automated teller machines (ATMs), virtual cash registers (VCRs), kiosks, security systems, access systems, and the like. An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards. In some embodiments, an access device can be a user device operated by a second user, when a user device is operated by a first user.

An "interaction" may include a reciprocal action or influence. An interaction can include a communication, contact, or exchange between parties, devices, and/or entities. Example interactions include a transaction between two parties and a data exchange between two devices. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

An "amount" can include a quantity of something. An amount can include a total of a thing or things in number, size, value, or extent.

An "offline amount" can include a quantity of something that may be used when offline (e.g., when current communication with a server computer is not present). An offline amount can be stored locally on a user device. For example, an offline amount can be stored in a secure element on a user device. An offline amount can be utilized during an offline interaction. For example, a first user can select to provide an amount to a second user while the first user's device is not connected to or in communication with a server computer (e.g., is not online). The first user device can deduct the amount to be provided from the offline amount stored in the secure element.

An "online amount" can include a quantity of something that may be used when online (e.g., when a user device can communicate with a server computer). An online amount can be stored on a server computer. For example, a plurality online amounts associated with a plurality of users can be stored on a server computer and/or a database maintained by the server computer. In some embodiments, an online amount can be utilized during an online interaction. In other embodiments, an amount from the online amount on a server computer can be transferred to an offline amount on a user device. For example, a server computer can deduct an amount from an online amount associated with a first user, then provide the amount in a secure message to a first user device. The first user device can include the received amount into an offline amount stored in a secure element.

A "resource provider" may be an entity that can provide a resource such as goods, services, information, and/or access. Examples of resource providers includes merchants, data providers, transit agencies, governmental entities, venue and dwelling operators, etc.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

The term "public/private key pair" may include a pair of linked cryptographic keys generated by an entity. The public key may be used for functions such as encrypting a message to send to the entity or for verifying a digital signature which was supposedly made by the entity. The private key may be used for functions such as decrypting a received message or applying a digital signature. The public key can be authorized by a certificate authority, which can store the public key in a database and distribute it to any other entity which requests the public key. The private key can be kept in a secure storage medium and will usually only be known to the entity. However, the cryptographic systems described herein may feature key recovery mechanisms for recovering lost keys and avoiding data loss. Public and private keys may be in any suitable format, including those based on Rivest-Shamir-Adleman (RSA) or elliptic curve cryptography (ECC).

A "digital signature" may include a type of electronic signature. A digital signature may encrypt documents with digital codes that can be difficult to duplicate. In some embodiments, a digital signature may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" or "digital certificate" may include an electronic document and/or data file. In some cases, the certificate or the digital certificate may be a device certificate. In some embodiments, a digital certificate may use a digital signature to bind a public key with data associated with an identity. A digital certificate may be used to prove the ownership of a public key. The certificate may include one or more data fields, such as the legal name of the identity, a serial number of the certificate, a valid-from and valid-to date for the certificate, certificate related permissions, etc. A certificate may contain a "valid-from" date indicating the first date the certificate is valid, and a "valid-to" date indicating the last date the certificate is valid. A certificate may also contain a hash of the data in the certificate including the data fields. A certificate can be signed by a certificate authority.

A "certificate authority" may include an entity that issues digital certificates. A certificate authority may prove its identity using a certificate authority certificate, which includes the certificate authority's public key. A certificate authority certificate may be signed by another certificate authority's private key or may be signed by the same certificate authority's private key. The latter is known as a self-signed certificate. The certificate authority may maintain a database of all certificates issued by the certificate authority. The certificate authority may maintain a list of revoked certificates. The certificate authority may be operated by an entity, for example, a processing network entity, an issuer, an acquirer, a central bank etc.

A "witness" can include evidence or proof of something. In some embodiments, a "witness" can be a term used in cryptography, that can be a tuple (or other value) that can be used to verify an expected result. A witness can be input into a condition that can evaluate the witness. For example, a witness can include proof of an event, such as transferring a resource during an interaction. A witness can act as sufficiently satisfying proof to one or more parties (e.g., two or more parties) involved in an interaction.

A "condition" can include a state of affairs that must exist or be brought about before something else is possible or permitted. A condition can be a condition function that evaluates whether or not something is permitted. A condition can accept a witness as input. A condition can be evaluated to determine whether or not a witness satisfies the condition. In some cases, a condition can be a mathematical function that takes a witness as an input and outputs a value of 1 if the witness satisfies the condition and outputs a value other than 1 if the witness does not satisfy the condition.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Table 1, below, illustrates some variables and functions that may be utilized herein and their descriptions.

TABLE 1

Variable and function notation

| Variable | Description |
|---|---|
| S.clientRegistry | Server S's registry of valid certificates |
| S.TARegistry | Server S's registry of valid trusted applications |
| S.onBal$_A$ | Client A's online amount stored at S |
| S.i$_A$ (e.g., a counter value) | Client A's index maintained by S |
| D$_A$ | Client A's secure element/hardware |
| T$_A$ | Client A's trusted application deployed on D$_A$ |
| (sk$_s$, vk$_s$) | Server S's signing key pair (private key, public key). Also referred to as (secret key, verification key). |
| (sk$_A$, vk$_A$) | Client A's signing key pair (private key, public key). Also referred to as (secret key, verification key). |
| (T$_A$.sk, T$_A$.vk) | Ta's signing key pair |
| cert$_A$ | Certificate for client A consisting of vk$_A$ and a signature on it by S certifying that vkA was issued by S |
| T$_A$.cert | Certificate for trusted application consisting of T$_A$.vk and a signature on it by S certifying that T$_A$.vk was issued by S |
| T$_A$.j (e.g., a counter value) | Client A's index maintained by T$_A$ |
| T$_A$.log | List of offline interactions received by T$_A$ |
| P.amount | Amount money transferred by interaction response message P |
| P.senderCert | Certificate of the sender of interaction response message P |
| P.receiverCert | Certificate/key of the receiver of interaction response message P |
| P index | Index of interaction response message P |
| P.time | Time when interaction response message P was created |
| **Function** | **Description** |
| H(x) | Outputs a cryptographic hash of x |
| Sign(x, sk) | Outputs a signature of x signed with signing key sk |
| SigVerify(x, σ, vk) | Outputs 1 if signature σ over x using verification key vk is valid |
| CertVerify(cert) | Outputs 1 if SigVerify(cert.vk, cert.sig, vks) $\stackrel{?}{=}$1 |
| TACertVerify(cert, vks) | Outputs 1 if SigVerify([cert.vk, "OIS"], cert.sig, vks) $\stackrel{?}{=}$1 |
| OEMVerify(vk, cert, M, vk$_M$) | Outputs 1 if SigVerify([vk, "Secure elemenf"IM], cert, vk$_M$) $\stackrel{?}{=}$1 |
| T$_A$.Deposit(x, . . . ) | Deposits x amount of money into client A's secure hardware T$_A$ |
| T$_A$.Withdraw(x, . . . ) | Withdraws x amount of money from client A's secure hardware T$_A$ |
| T$_A$.Pay(x, . . . ) | Debits x amount of money from trusted application and outputs an interaction response message P |
| T$_A$.Collect(P) | Credits an interaction response message P into T$_A$'s amount |

FIG. 1 shows a system 100 according to embodiments of the disclosure. The system 100 comprises a first user device 102, a server computer 104, a second user device 106, a plurality of devices 108, and a certificate authority 110. The first user device 102 can be in operative communication with the server computer 104, the second user device, and one or more devices of the plurality of devices 108. The server computer 104 can be in operative communication with the certificate authority 110. In some embodiments, when offline, the first user device 102 can communicate with the second user device 106 via a short-range communication channel (e.g., Bluetooth, Near-Field Communication (NFC), etc.). In some embodiments, when online, the first user device 102 can communication with the server computer 104 via a long-range communication channel (e.g., over the air communications, etc.). However, it is understood that embodiments are not limited thereto.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between the devices in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network that may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The first user device 102 can include a user device operated by a user (e.g., a phone). The first user device 102 can include a secure element as described in further detail herein. The user can utilize the first user device 102 to perform an interaction (e.g., a transaction, a data transfer, etc.) with the second user device 106. The first user device 102 can perform a transaction with the second user device 106 when the first user device 102 and the second user device 106 are offline (e.g., not connected to the server computer 104). The second user device 106 can include a resource provider device operated by a resource provider (e.g., a phone). In other cases, the second user device 106 can be operated by a second user that is not a resource provider.

The server computer 104 can include a remote computer. The server computer 104 can provide an offline amount to the first user device 102 to be stored in a secure element of the first user device 102. For example, the first user device 102 can request an offline amount from the server computer 104. In other situations, the server computer 104 can push an offline amount to the first user device 102.

In some embodiments, the first user device 102 can perform an interaction with one or more devices of the plurality of devices 108, which can include resource provider devices and/or user devices. The plurality of devices 108 can include any suitable number of user devices and/or resource provider devices.

In some embodiments, the first user device 102 and the second user device 106 can perform an offline interaction. In some embodiments, the second user device 106 receives an offline amount from the first user device 102. The second user device 106 can then perform a second offline transaction with a device of the plurality of devices 108.

In other embodiments, the second user device 106 receives the offline amount from the first user device 102. The second user device 106 then goes online and connects to the server computer 104. The second user device 106 then sends a request to the server computer 104 to collect an amount equal to the received offline amount.

The certificate authority 110 can create and issue certificates to the server computer 104. The certificate authority 110 may include one or more server computers. In some embodiments, the certificate authority 110 may be capable of issuing certificates to resource provider device, authorizing entity computers, transport computers, server computer, network processing computers, user devices, etc. The certificate authority 110 may be capable of generating a certificate authority key pair. In some embodiments, the certificate authority 110 may be in operative communication with and/or operatively coupled to the server computer 104 and may generate certificates on behalf of the server computer 104. In some embodiments, a root certificate authority, not shown, can issue certificates to the certificate authority 110. The certificate authority 110 can then utilize the certificate obtained from the root certificate authority to issue certificates to the server computer 104.

Figure 2:
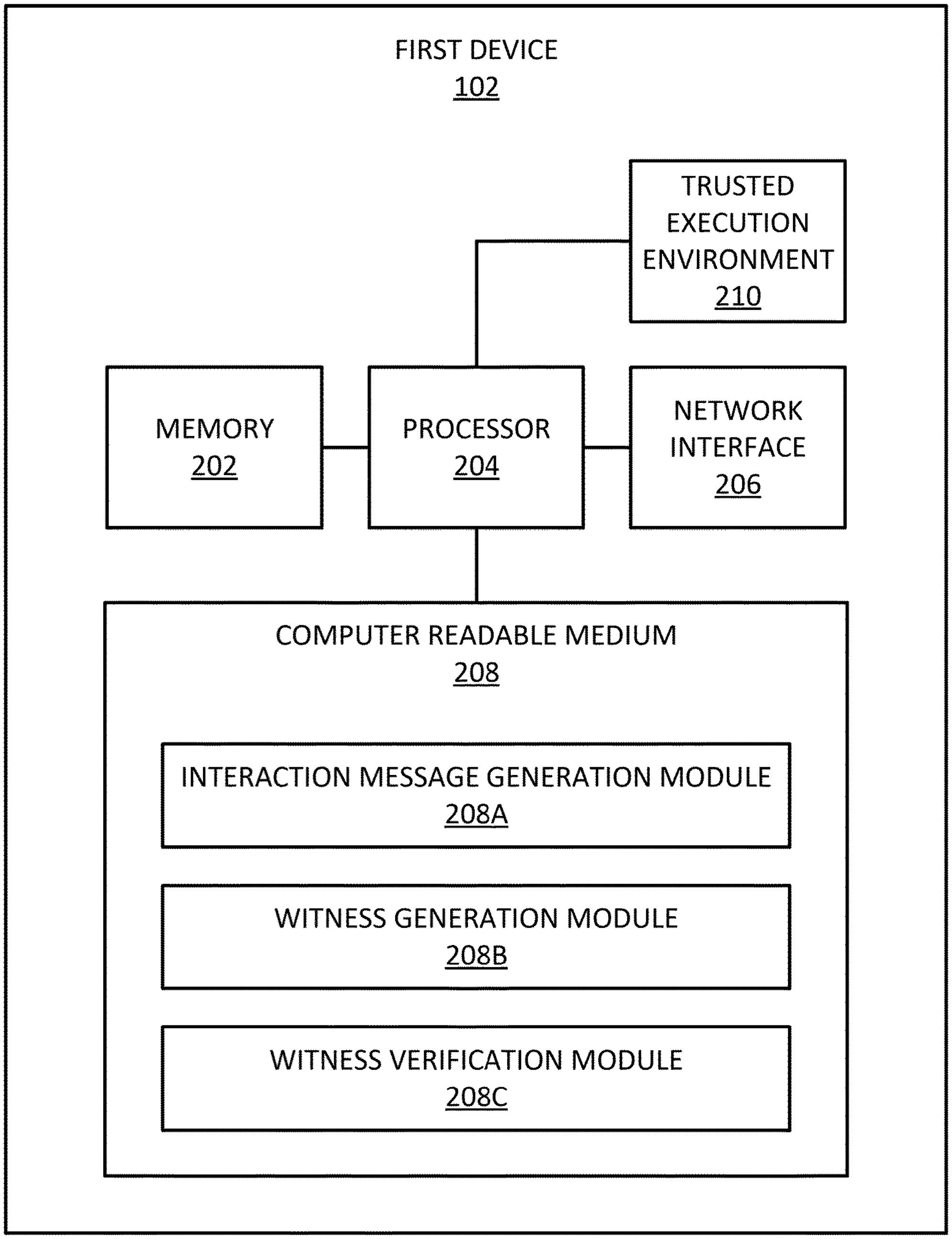
FIG. 2 shows a block diagram of components of a user device according to embodiments.

FIG. 2 shows a block diagram of a first user device according to embodiments. The exemplary first user device 102 may comprise a processor 204. The processor 204 may be coupled to a memory 202, a network interface 206, a computer readable medium 208, and a trusted execution environment 210. The computer readable medium 208 can comprise any suitable modules. For example, the computer readable medium 208 can comprise an interaction message generation module 208A, a witness generation module 208B, and a witness verification module 208C.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: generating, by a first user device, an interaction message during an interaction between the first user device and a second user device, wherein the interaction message includes an amount, an expiry time, and a condition; providing, by the first user device, the interaction message to the second user device, wherein the second user device creates a witness that satisfies the condition and provides the witness to the first user device; receiving, by the first user device, the witness from the second user device; verifying, by the first user device, that the witness satisfies the condition; if the witness satisfies the condition and is received prior to the expiry time, signing, by the first user device, the witness using a first user device private key to obtain a signed witness; and providing, by the first user device, the signed witness to the second user device, wherein the second user device verifies a signature of the signed witness and proceeds with obtaining the amount.

The interaction message generation module 208A can comprise code or software, executable by the processor 204, for generating interaction messages. The interaction message generation module 208A, in conjunction with the processor 204, can generate an interaction message for an interaction between the first user device 102 and a second user device. The interaction message generation module 208A, in conjunction with the processor 204, can generate an interaction message comprising an amount, an expiry time, and a condition. The interaction message can be a transaction message that includes details regarding a transaction that performed between the first user device 102 and the second user device.

The witness generation module 208B can comprise code or software, executable by the processor 204, for generating a witness. The witness generation module 208B, in conjunction with the processor 204, can generate a witness for an interaction, if the first user device 102 receives an interaction message from a different device (e.g., a second user device). The witness generation module 208B, in conjunction with the processor 204, can generate a witness for the interaction between the devices such that the witness satisfies the condition included in the interaction message.

The witness generation module 208B, in conjunction with the processor 204, can generate a witness that acts as a proof of performing an action. For example, the witness can be proof that a second user device has performed an action according to the interaction between the second user device and a first user device. For example, the witness can include a value generated from data included in the interaction message (e.g., the amount, certificates, etc.), a value derived from a photo of resources procured, etc.

As another example, the condition can be that the interaction occurs between the first user device and the second user device at a particular location (e.g., at a zip code of 94608). The witness can be a zip code or other data item that indicates a location. If the witness zip code is equal to 94608, then when the witness zip code is input into the condition function, the condition function will output a value of 1 to indicate that the condition is satisfied. The witness generation module 208B, in conjunction with the processor 204, can generate the witness by obtaining a current location zip code using, for example, global positioning system coordinates and determining a zip code. In some embodiments, the witness can be global position system coordinates for a condition that evaluates global positioning system coordinates. In some embodiments, the witness that is a location can be sufficiently satisfying to both parties involved in the interaction if the location is obtained from a trusted source such as a third party or a secure element and may be signed by the trusted source or the third party using a cryptographic private key.

As another example, the condition can be a function that compares a pre-generated hash value to an input witness that is a during interaction generate hash value. The pre-generated hash value can be created from a combination of any of the following: an intended location, the interaction amount, a proof that a different interaction was performed, a proof that data was transferred, and/or other data that can prove something. In such a case, the witness can be generated by hashing the relevant information, such as the current location, the interaction amount, the proof that the different interaction was performed, the proof that the data was transferred, and/or the other data that can prove something.

As a simple mathematical example, if the condition indicates that an input value should be a value that is a square of a prime number. A witness that satisfies the condition is the value 4 since the value 4 is a square of the prime number 2 (e.g., $2^2=4$).

The witness verification module 208C can comprise code or software, executable by the processor 204, for verifying a witness. The witness verification module 208C, in conjunction with the processor 204, can verify whether or not a received witness satisfies a condition. For example, witness verification module 208C, in conjunction with the processor 204, can receive a witness from a second user device that generated the witness. The witness verification module 208C, in conjunction with the processor 204, can input the witness into the condition, which is a function, to determine an output of the condition function. The witness verification module 208C, in conjunction with the processor 204, can determine that the witness satisfies the condition if the output of the condition function, with the witness as input, is equal to a value of 1 (or other predetermined value that indicates satisfaction, such as 0).

The network interface 206 may include an interface that can allow the first user device 102 to communicate with external computers. The network interface 206 may enable the first user device 102 to communicate data to and from another device (e.g., a second user device, a server computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The trusted execution environment 210 can be included on the first user device 102. The trusted execution environment 210 can be located within any suitable secure hardware element included in the first user device 102. In some embodiments, the trusted execution environment 210 can be a secure software module in the first user device 102. In some embodiments, the trusted execution environment 210 can be located partially within a secure element and partially outside of the secure element, where each portion provides different capabilities. In other embodiments, the trusted execution environment 210 can be a secure element in the first user device 102.

The trusted execution environment 210 can be a hardware-assisted execution environment within a system with its own resources (e.g., memory, registers, peripherals, and its own software stack, such as OS, applications etc.). The resources of the trusted execution environment 210 as well as the processes running within the trusted execution environment 210 cannot be accessed by the rest of the system directly.

The first user device 102 can host a split trusted execution environment 210 that has resources that are split into two execution environments via hardware means: a rich operating system execution environment (REE) and a trusted execution environment (TEE). The trusted execution environment 210 has its own dedicated memory, registers etc. along with its own trusted operating system. On top of the trusted operating system, third-party trusted applications can be built by making use of trusted execution environment internal APIs. Similarly, a client application can be built on top of the rich operating system. Applications running in the trusted execution environment 210 can access the resources of the rich operating system execution environment, but application running in the rich operating system execution environment cannot access the resources of the trusted execution environment 210. A client application residing in the rich operating system execution environment can communicate with a trusted application only via the trusted execution environment client APIs if the client application requests the services of the trusted application.

There can be different variations of trusted execution environments 210 depending on the platform upon which they run and/or the hardware used to achieve the isolation in the system. Since various embodiments can be performed on mobile devices, trusted execution environments that run on mobile devices are provided as an example. However, it is noted that embodiments are not limited thereto. For example, the trusted execution environment can use a TrustZone architecture (by Arm). The TrustZone architecture achieves the isolation in the system by augmenting computation cores with a mode that allows them to operate only for the trusted execution environment. A physical core is split into two virtual cores with TrustZone: one virtual core operates only for the trusted execution environment 210 and the other operates for the rest of the system. To switch from one environment to another, system calls can be used. Applications running within the trusted execution environment 210 may be further isolated from each other by the OS running in trusted execution environment 210.

Before registering a device which uses trusted execution environment functionalities in the offline interaction system protocol, an original equipment manufacturer (OEM) can attest that the trusted execution environment within a device is set up correctly. Then, embodiments can ensure that the trusted execution environment 210 is provisioned with the right applications. Finally, embodiments can register the instance of a trusted application running in a device with the server computer 104 if the attestation and the provisioning verifications are successful.

Figure 3:
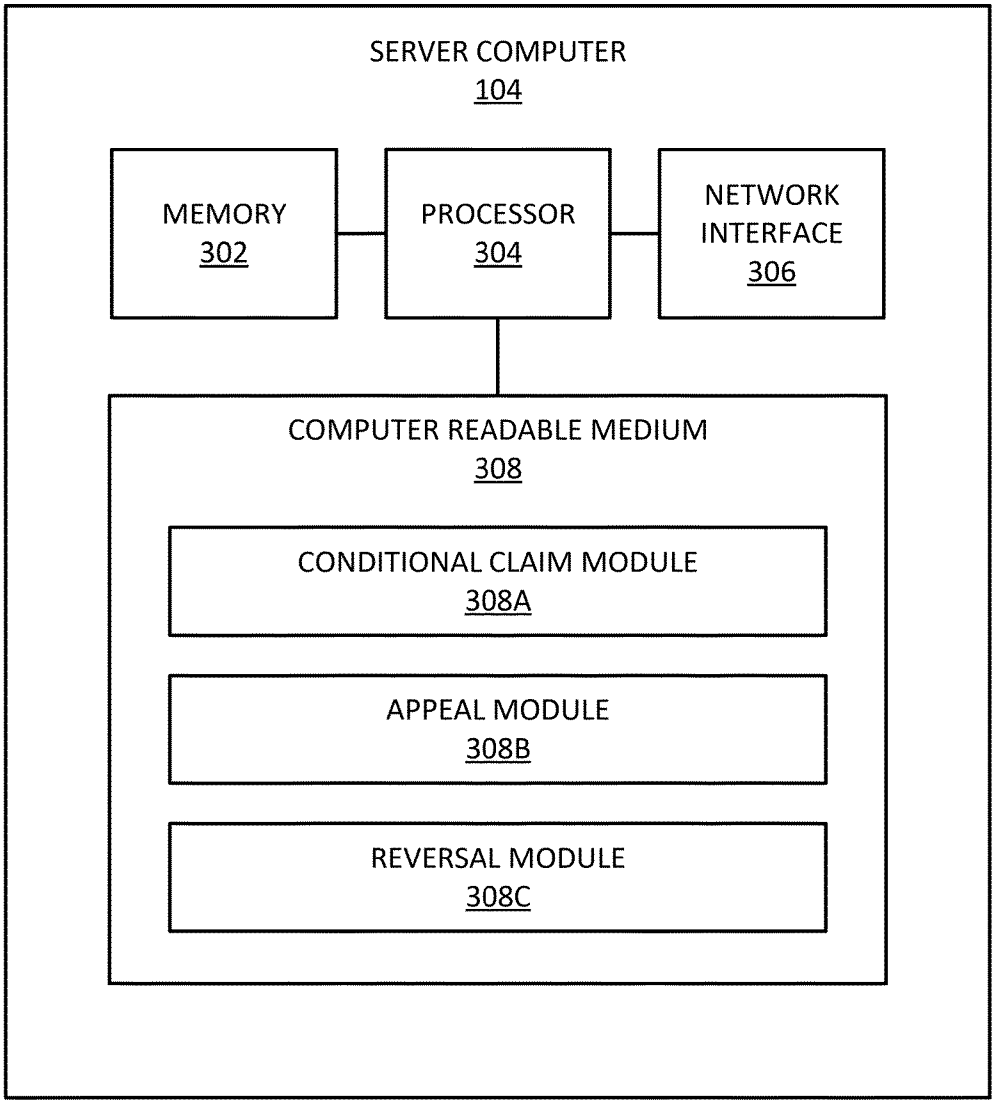
FIG. 3 shows a block diagram of components of a server computer according to embodiments.

FIG. 3 shows a block diagram of a server computer according to embodiments. The server computer 104 may comprise a processor 304. The processor 304 may be coupled to a memory 302, a network interface 306, a computer readable medium 308, and a trusted execution environment 310. The computer readable medium 308 can comprise any suitable modules. For example, the computer readable medium 308 can comprise a conditional claim module 308A, an appeal module 308B, and a reversal module 308C.

The memory 302 can be used to store data and code. The memory 302 may be coupled to the processor 304 internally or externally (e.g., cloud based data storage), and may comprise any combination of volatile and/or non-volatile memory, such as RAM, DRAM, ROM, flash, or any other suitable memory device.

The computer readable medium 308 may comprise code, executable by the processor 304, for performing methods described herein.

The conditional claim module 308A can comprise code or software, executable by the processor 304, for processing a claim request received from a device. The conditional claim module 308A, in conjunction with the processor 304, can determine whether or not to add an amount to a requesting device's online balance that is maintained by the server computer 300. The conditional claim module 308A, in conjunction with the processor 304, can perform the method illustrated in Table 5.

For example, the conditional claim module 308A, in conjunction with the processor 304, can receive an interaction message and verify the data included in the interaction message as described herein. If the interaction message's data is verified, the conditional claim module 308A, in conjunction with the processor 304, can modify the requesting device's online balance by the amount as indicated in the interaction message.

The appeal module 308B can comprise code or software, executable by the processor 304, for processing an appeal request received from a device. The appeal module 308B, in conjunction with the processor 304, can determine whether or not to modify an appealing device's online balance that is maintained by the server computer 300. The appeal module 308B, in conjunction with the processor 304, can perform the method illustrated in Table 6.

For example, the appeal module 308B, in conjunction with the processor 304, can receive an appeal interaction message from a second user device when the second user device did not properly receive a signed witness during an interaction with a first user device. The appeal module 308B, in conjunction with the processor 304, can validate the data in the appeal interaction message, as described herein, as well as validate that the witness for the interaction satisfies the condition for the interaction. The appeal module 308B, in conjunction with the processor 304, can determine to modify the appealing device's online balance by the amount in the appeal interaction message, if the appeal module 308B, in conjunction with the processor 304, validates the data.

The reversal module 308C can comprise code or software, executable by the processor 304, for processing a reversal request received from a device. The reversal module 308C, in conjunction with the processor 304, can determine whether or not to modify a requesting device's online balance that is maintained by the server computer 300. The reversal module 308C, in conjunction with the processor 304, can perform the method illustrated in Table 7.

For example, the reversal module 308C, in conjunction with the processor 304, can receive a reverse interaction message from a first user device when the first user device did not properly receive a witness during an interaction with a second user device. The reversal module 308C, in conjunction with the processor 304, can validate the data in the reverse interaction message, as described herein. The reversal module 308C, in conjunction with the processor 304, can modify the requesting device's online balance by the amount in the reverse interaction message, if the reversal module 308C, in conjunction with the processor 304, validates the data.

The network interface 306 may include an interface that can allow the server computer 104 to communicate with external computers. The network interface 306 may enable the server computer 104 to communicate data to and from another device (e.g., a second user device, a server computer, etc.). Some examples of the network interface 306 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 306 may include Wi-Fi™. Data transferred via the network interface 306 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 306 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Embodiments provide for an offline interaction system configured to perform conditional interactions. The following technical problems can be present for conditional offline interactions: 1) how do the devices determine that the interaction is complete?; 2) how does the sender device re-obtain their amount if the interaction is not complete?; and 3) how does the receiver device obtain the amount if the sender device acts maliciously. Embodiments solve these, and other, technical problems.

Embodiments can utilize and generalize hash time lock commitments in an offline setting. Specifically, a conditional interaction between a user device A and a user device B can occur as follows. First, the user device A and the user device B agree on a condition $\phi$ and an expiry time t. Then, the user device A sends a conditional payment P (also referred to as a conditional interaction) to the user device B for an amount x. At this point, the user device A's offline balance is reduced by x. If the user device B possesses a witness w such that $\phi(w)=1$ (e.g., when the condition function $\phi$ receives an input of the witness w, the function outputs a value of 1), then the user device B will be able to use the witness w to claim or collect the amount before the expiry time t. In such an event, the user device A will learn the witness w (e.g., before time t). On the other hand, if the user device B does not know the witness w or does not claim or collect the amount before time t, then the payment P is effectively reversed, and the user device A's balance is increased by x.

Conditional offline interactions according to embodiments provide for several differences and technical advantages over standard interactions as well as non-conditional offline interactions. As described above, conditional offline interactions can have at least two parameters: a condition $\phi$; and an expiry time t which are not present in non-conditional offline interactions. Non-conditional offline interactions cannot be reversed, whereas conditional offline interactions can be reversed.

Furthermore, conditional offline interactions provide for a technical advantage of not requiring a third party to verify conditional interactions between two devices. For example, in a standard conditional interaction (e.g., in a conditional payment transaction), the two interacting parties need to communicate with a third party mediator (e.g., an authorization computer) to validate and authorize the conditional interaction.

Figure 4:
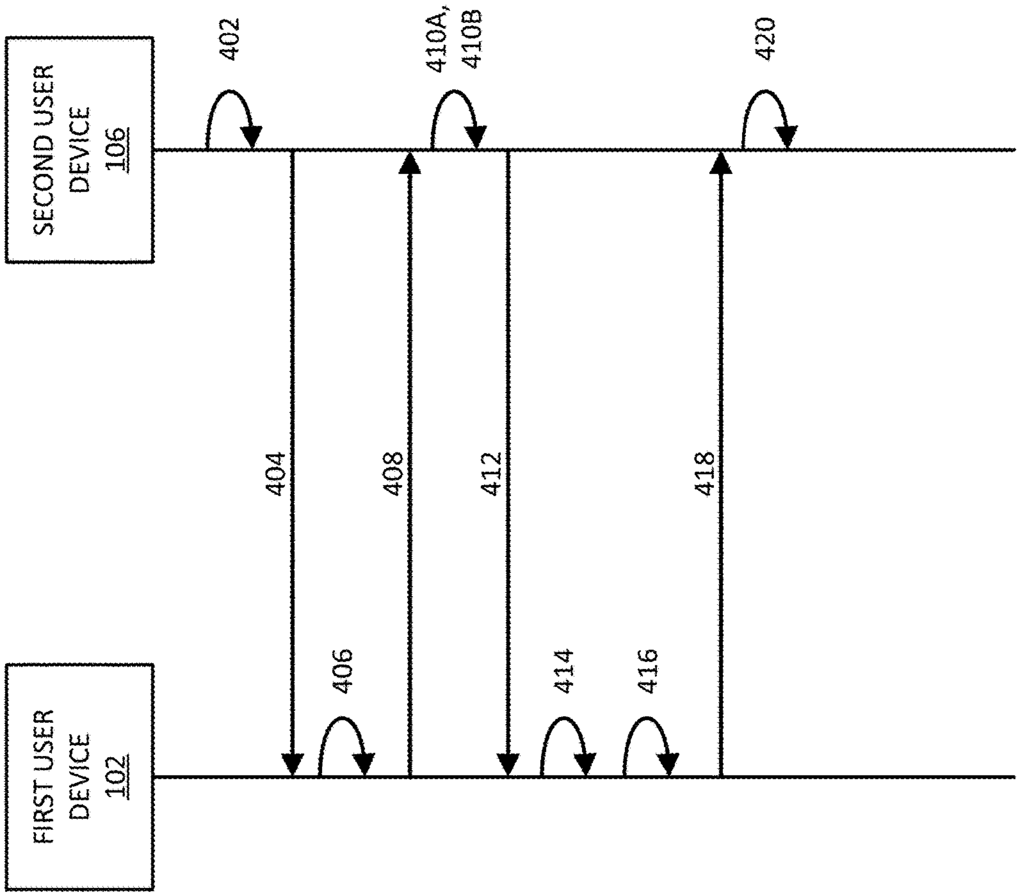
FIG. 4 shows a flow diagram illustrating a conditional interaction method according to embodiments.

FIG. 4 shows a flow diagram illustrating a conditional interaction method according to embodiments. The method illustrated in FIG. 4 will be described in the context of a conditional payment. It is understood, however, that the invention can be applied to other circumstances (e.g., conditional data transfers, etc.). The method illustrated in FIG. 4 can be performed by a first user device 102 and a second user device 106. The first user device 102 includes a secure element or a trusted application. The second user device 106 may or may not include a secure element or a trusted application. Table 2, below, illustrates a protocol that can be associated with the method illustrated in FIG. 4.

Prior to step 402, a first user of the first user device 102 and a second user of the second user device 106 can decide to perform an interaction (e.g., a payment). The first user and the second user can agree on a condition (e.g., designated as $\phi$) and an expiry time (e.g., designated as t). The condition must be satisfied before the interaction is processed. For example, the condition can be a requirement that the interaction will proceed only if certain resources (e.g., goods) are provided by the second user to the first user. The condition can be any suitable agreement and/or data security rule that can be established prior to the interaction and completed during the interaction to allow the interaction to proceed. The expiry time can be a point in time at which, if the interaction has not yet been completed, the interaction is terminated and is considered void.

As an illustrative example, the condition can be a requirement that a delivery of an item associated with an interaction be performed at a particular place, at a particular time, and by a particular entity. For example, the condition can evaluate if an interaction involving the delivery of an item by a third-party courier to a location occurs in a zip code of 94608 at a particular time. In this example, the witness may be the zip code of the courier's phone when the courier delivers the item to the location (e.g., as determined by the courier's phone GPS location, and a zip code-GPS location mapping table), the courier's ID, and a timestamp. The witness provides sufficient information to satisfy both parties to the interaction that the interaction is proceeding as expected. The condition function can accept the witness as an input and can output a value of 1 if the witness satisfies the condition, or 0 if it does not.

As a second illustrative example, the condition can be a condition that the second user device 106 obtains a secret (e.g., a secret code) that is created by the first user device 102 by initiating shipping of an agreed upon resource to the first user of the first user device 102. The first user device 102 can create a secret code (e.g., 1234). The first user device 102 can then provide the secret code to a third party that can manages shipping of resources. During the interaction, the second user device 106 can obtain the secret code from the third party if the second user device 106 initiates shipping of a resource via the third party to the first user device 102. The third party can provide the secret code to the second user device 106, where the second user device 106 utilizes the secret code as the witness that satisfies the condition. In some embodiments, the condition can accept a witness that is a hash of the secret code. The witness provides sufficient information to satisfy both parties to the interaction that the interaction is proceeding as expected.

At step 402, the second user device 106 can generate an interaction request message for the interaction between the first user device 102 and the second user device 106. The interaction request message can include at least an amount (e.g., an amount that the second user device 106 is requesting from the first user device 102). In some embodiments, the interaction request message can include the condition. As such the second user device 106 can generate the condition. However, in other embodiments, the first user device 102 can generate the condition.

In some embodiments, the interaction request message can also include a second user device certificate. Since the second user device 106 is the receiver in the interaction with the first user device 102 in this example, the second user device certificate included in the interaction request message can be referred to as a receiver certificate (e.g., designated as receiverCert). If the second user device 106 includes a secure element or trusted application that is registered with the server to operate in the offline interaction system (e.g., $B \in$ S.TARegistry), the receiver certificate can be a second user device secure element certificate or a second user device trusted application certificate (e.g., receiverCert$\leftarrow T_B$.cert, where $T_B$ is the second user device secure element). Otherwise, if the second user device does not include a secure element or trusted application, the receiver certificate can be a second user device certificate (e.g., receiverCert$\leftarrow$-cert$_B$).

A certificate can include a public key of the entity for which the certificate is issued to, or otherwise assigned with. As such, the second user device certificate can include a second user device public key. Also, the second user device secure element certificate can include a second user device secure element public key. The public key can correspond to a private key maintained securely by the device or secure element.

The condition can be created digitally such that it is a function that accepts an input. The input to the condition function can be a witness. When the witness successfully fulfils the condition agreed upon by the first user and the second user, the condition function can output a value of 1 or other predetermined success value.

As an illustrative example, the second user device 106 can be operated by a second user that is to deliver an item to a first user of the first user device 102 for an amount of money. The second user device 106 can generate an interaction request message including an amount of "$10," a condition that a resource needs to be delivered by the second user to a location in a zip code of 94608 (e.g., that the second user device 106 is located in the zip code of 94608), and a second user device certificate that includes the second user device public key. The witness that would satisfy the condition may include the zip code of the second user's phone (as determined using the GPS location of the second user device 106) and an identifier for the second user's phone. This information can serve as proof, acceptable to the first user and the second user, that the second user delivered a particular item to the first user.

At step 404, the second user device 106 can send the interaction request message to the first user device 102. As an example, the second user device 106 can transmit the interaction request message over a communication channel that utilizes Bluetooth, Bluetooth low energy, ultra-wideband, an electrical connection point, the Internet, or other short, medium, or long-range communication channel.

At step 406, the first user device 102 can generate another interaction message (e.g., a conditional offline interaction request message) (e.g., designated as P) that can include an amount (e.g., designated as x), the condition, an expiry time (e.g., designated as t), and the receiver certificate, which was received in the interaction request message in step 404. The expiry time can be a time at which the interaction is terminated due to a lack of receiving a witness that establishes the completion of the condition by the second user device 106. The expiry time can be an original expiry time that is either received from the second user device 106 or otherwise agreed upon by the first user device 102 and the second user device 106.

The interaction message can further include any other suitable information (e.g., cryptographic keys, certificates, a current time, user identifiers, user device identifiers, etc.). For example, the interaction message can include a first user device secure element certificate that includes a first user device secure element public key.

Specifically, the secure element of the first user device 102 can generate the interaction message as P←-$T_A$.ConditionalPay (x, receiverCert, ϕ, t), as illustrated in the "ConditionalPay" function in Table 3. For example, the secure element of the first user device 102 can generate the interaction message as follows.

The secure element of the first user device 102 can verify that the current time is less than the expiry time. If the current time is greater than or equal to the expiry time, then the interaction has expired and the secure element of the first user device 102 can terminate the process.

The secure element of the first user device 102 can then create the interaction message and decrease an offline balance maintained by the secure element (e.g., designated as T.bal). For example, the first user device 102 can perform the "Pay(x, receiverCert)" function as illustrated in Table 3. To do so, the secure element can determine whether or not the secure element stores a certificate (e.g., abort if T.cert=∅). If the secure element does not have a certificate, then the secure element can abort the process. The secure element can also determine whether or not the amount included in the interaction request message exceeds the offline balance maintained by the secure element (e.g., T.bal<x). If the secure element determines that the offline balance is smaller than the amount, then the secure element can abort the process. The secure element can then modify the offline balance by the amount. The secure element can also increase a counter or index that is maintained by the secure element by 1. The counter or index can track the number of interactions performed by the first user device 102. The secure element can then create the interaction message including the amount, the secure element certificate, the second user device certificate, and in some embodiments, the counter or index. In some embodiments, the secure element can create a digital signature (e.g., designated as P.sig) on the interaction message using a secure element private key that corresponds to the secure element public key. At this point, if the interaction was not a conditional interaction, the secure element could return the interaction message to the first user device 102 for use in the interaction. However, for the conditional interaction, the secure element continues processing as follows.

The secure element of the first user device 102 can then add a type into the interaction message. The type can indicate the type of interaction. For example, the type can be "Conditional." The secure element can add a type of "Conditional" into the interaction message. For example, the secure element can perform P.type←"Conditional."

The secure element of the first user device 102 can include the condition and the expiry time into the interaction message. For example, the secure element can perform P.condition←ϕ and P.expiry←t.

The secure element can then update the signature on the interaction message since this is a conditional message that has included the type, the condition, and the expiry time, thus changing the overall contents of the message. Therefore, a new signature is needed. The secure element can generate an updated signature. The secure element can generate the signature (e.g., P.sig) using the secure element private key (T.sk). For example, the secure element can perform Update P.sig←Sign ([P.amount, P.senderCert, P.receiverCert, P.index, P.condition, P.expiry], T.sk).

The secure element can then add the interaction message (e.g., designated as P) to an interaction log (e.g., designated as T.outPaymentLog) maintained by the secure element. The secure element can append the interaction message along with an indicator of 0 (e.g., indicating that this is a first portion of the interaction message, more can be added later with an indicator of 1) to the interaction log. For example, the secure element can perform Append (P, 0) to T.outPaymentLog.

At step 408, after generating the interaction message, the first user device 102 can provide the interaction message to the second user device 106.

As an illustrative example, the first user device 102 can provide the interaction message to the second user device 106. The interaction message can include the amount of "$10," the condition that a resource needs to be delivered by the second user to a location in a zip code of 94608 (e.g., that the second user device 106 is located in the zip code of 94608), an expiry time of "Jan. $1^{st}$, 2023 at 2:30 PM," the second user device certificate, the first secure element certificate, an index value of 6 (e.g., this is the $6^{th}$ interaction performed by the first user device 102), and the digital signature (e.g., that was created by the secure element).

At steps 410A and 410B, the second user device 106 can verify the interaction message and generate a witness, respectively. The second user device 106 can verify some aspects of the interaction message during step 410A, then generate a witness at step 410B, then continue to verify additional aspects of the interaction message returning to step 410A.

For example, at step 410A, after receiving the interaction message, the second user device 106 can verify the interaction message. The second user device 106 can verify the contents of the interaction message. For example, the second user device can perform the "ConditionalPayVerify" function illustrated in Table 4, below.

To verify the interaction message, the second user device 106 can determine whether or not the original condition created during step 402 matches the condition included in the interaction message. If the original condition does not match the condition included in the interaction message, then the second user device 106 can terminate the process.

The second user device 106 can further verify the interaction message by determining whether or not the original expiry time matches the expiry time included in the interaction message. If the original expiry time does not match the expiry time included in the interaction message, then the second user device 106 can terminate the process.

At step 410B, the second user device 106 can obtain a witness (e.g., designated as w) that satisfies the condition. For example, the witness can include or be derived from the zip code of 94608 as determined from data generated by the second user device 106 and an identifier for the second user device 106 (e.g., a phone number). This may serve as proof that the second user delivered the requested resource to the location expected by the first user of the first user device 102. The second user device 106 can determine the zip code of the second user device 106 using a global positioning system or other location determination method in the second user device 106, and the second user device 106 can automatically generate the witness using this information and the identifier for the second user device 106.

As another illustrative example, the condition can be that the second user device 106 obtains a secret code from a third party that manages shipping resources. The secret code can be originally generated by the first user device 102 and provided to the third party that manages shipping resources. During step 410B, the second user device 106 and/or the second user of the second user device 106 can initiate shipping of a resource, agreed upon at step 402, with the third party. Upon processing the shipping request, the third party can provide the secret code to the second user device 106. The second user device 106 can utilize the secret code (e.g., 1234) as the witness that satisfies the condition. In some embodiments, the secret code can first be hashed by the second user device 106, where the hashed secret code is the witness. For example, the second user device 106 can hash the secret code of 1234 to obtain a hashed secret code of ABCD.

Returning to step 410A, the second user device 106 can verify that the witness satisfies the condition (e.g., P.condition(w)=1). The second user device 106 can input the witness into the condition that is included in the interaction message. The second user device 106 can evaluate the condition using the witness to generate an output value. If the output value equals a value of 1, then the witness satisfies the condition. If the output value does not equal a value of 1, then the witness does not satisfy the condition.

As an illustrative example, the second user device 106 can input the zip code of 94608 as automatically determined by the second user device 106 and the second user device identifier into the condition and can determine an output value. Since input zip code and the second user device identifier are correct values, the condition can output a value of 1. However, if the second user device 106 was located in a different location (e.g., a zip code of 80516), then the condition would compare the input zip code of 80516 to the 94608 zip code, determine that they are different, and then output a value other than 1.

As a second illustrative example, the second user device 106 can input the hashed secret code of ABCD into the condition and determine an output value. The condition function can accept the hashed secret code of ABCD, then determine whether or not the input hashed secret code matches the predetermined hashed secret code of ABCD indicated in the condition. Since the hashed secret codes match in this case, the condition can output a value of 1. However, if the second user device 106 did not initiate shipping the resource to the first user via the third party, then the second user device 106 could not have obtained the secret code from the third party, and thus any value input into the condition would compare the wrong input value to the secret code of 1234 (or the hash thereof), determine that they are different, and then output a value other than 1.

The second user device 106 can further verify that the expiry time included in the interaction message is greater than the current time (e.g., that the interaction has not yet expired). If the expiry time has been passed, then the second user device 106 can terminate the process.

The second user device 106 can further verify the interaction message by determining that the type included in the interaction message matches a type of "Conditional," since this is a conditional interaction. If the type included in the interaction message is not "Conditional," then the second user device 106 can terminate the process.

The second user device 106 can further verify the interaction message by verifying that the receiver certificate included in the interaction message matches the second user device certificate. If the second user device 106 includes a secure element, then the second user device 106 can verify that the interaction message includes the receiver certificate that matches the second user device secure element certificate.

The second user device can further verify the interaction message by verifying the sender certificate (e.g., the first user device certificate or the first user device secure element certificate) that is included in the interaction message. For example, the second user device can perform TACertVerify (P.senderCert)=1. A certificate can be verified using a public key included in the certificate to verify a signature in the certificate that is created by a corresponding private key. As such, for example, the second user device can verify the signature included in the first user device secure element certificate using the first user device secure element public key included in the first user device secure element certificate.

The second user device can further verify the interaction message by verifying the signature included in the interaction message using the first user device secure element public key included in the first user device secure element certificate that is included in the interaction message.

In some embodiments, the second user device 106 can verify whether or not the interaction message is already included in an interaction message log (e.g., designated as B.inPaymentLog) maintained by the second user device 106 or a second user device secure element, if the second user device 106 includes a secure element. If the interaction message is already included in the interaction log, then the second user device 106 can terminate the process. If the interaction message is not included in the interaction log, then the second user device 106 can add the interaction message to the interaction log.

At step 412, after obtaining the witness and verifying the interaction message, the second user device 106 can provide the witness to the first user device 102. For example, the second user device 106 can provide the witness, which is a zip code of 94608 (as determined by the second user device) and the second user device identifier, to the first user device 102 prior to the expiry time of "Jan. 1$^{st}$, 2023 at 2:30 PM." In some embodiments, the second user device 106 can also provide the interaction message back to the first user device 102 along with the witness. For example, the interaction message can be provided back to the first user device 102 so that the first user device 102 can determine to which interaction the witness belongs. In other embodiments, the messages in FIG. 4 can each have an interaction identifier or session identifier to tie the messages together.

At step 414, after receiving the witness, the first user device 102 can determine whether or not the witness satisfies the condition. For example, the first user device 102 can input the witness into the condition function to determine an output value. The output value, which is output from the condition, can be evaluated by the first user device 102. If the output value is equal to 1, then the first user device 102 can determine that the witness satisfies the condition. If the output value is not equal to 1, then the first user device 102 can determine that the witness does not satisfy the condition.

Figure 7:
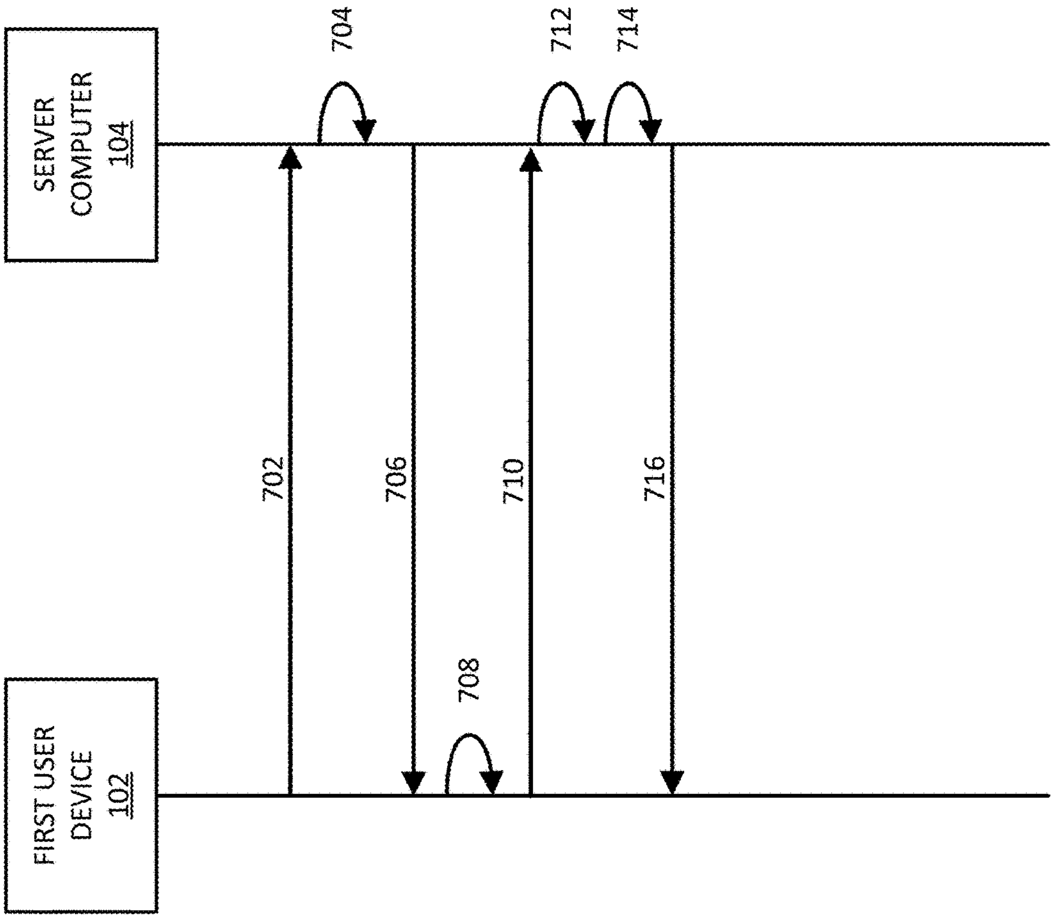
FIG. 7 shows a flow diagram illustrating a conditional reversal method according to embodiments.

If the witness does not satisfy the condition, or the witness was received after the expiry time, or if no witness was received at all, then the first user device 102 can reverse the payment, as described in reference to FIG. 7.

If the witness does satisfy the condition and was received prior to the expiry time, then process can continue with the interaction with the second user device 106 at step 416.

The first user device secure element can update the interaction log to include the witness, and in some embodiments, the interaction message received along with the witness. For example, the first user device secure element can store the witness and interaction message along with an indicator of 1 in association with the previously stored interaction message, which is stored with an indicator of 0, in the interaction log. By doing so, the first user device secure element can maintain a log of how the interaction progressed as well as when the interaction messages were stored.

At step 416, after determining that the witness satisfies the condition, the first user device 102 can generate a signed witness. The first user device 102 can create the signed witness by signing the witness with a first user device private key or a first user device secure element private key. The signed witness can be utilized by the second user device 106 to collect the amount for the interaction.

If the first user device 102 does not provide the signed witness to the second user device 106, then the second user device 106 may be unable to collect the amount, even if the witness satisfies the condition. In such a case, the second user device 106, can perform an appeal process, as described in FIG. 6 to be able to collect the amount without relying on the first user device 102 to provide the signed witness. This is advantageous in the case where the first user device 102 is malicious and does not want to provide the amount to the second user device 106 even though the interaction was satisfied by the second user device 106 (e.g., the first user device 102 does not want to pay for services rendered, etc.).

At step 418, the first user device 102 can provide the signed witness to the second user device 106.

At step 420, after receiving the signed witness, the second user device 106 can utilize the signed witness to proceed with obtaining the amount as indicated in the interaction message. The second user device 106 can obtain the amount in an offline method (e.g., via an offline collect process) or in an online method (e.g., via a conditional online claim process), as described in further detail in FIG. 5.

In some embodiments, the second user device 106 can update the interaction log with the signed witness.

In some embodiments, the interaction message can be a first interaction message, the interaction can be a first interaction, the amount can be a first amount, the expiry time can be a first expiry time, and the condition can be a first condition. The first user device 102 can perform a second interaction with a third user device. The third user device can be different than the second user device 106. However, it is understood that the first user device 102 can perform the second interaction with the second user device, therefore, the term third user device is inclusive of the second user device 106. The first user device 102 may not receive the witness from the third user device, if the third user device is malicious, broken, or otherwise unavailable. In such a case, the first user device 102 can perform the method illustrated in FIG. 7.

As another example embodiment, the condition can be that the second user device 106 has initiated shipping of a resource to the first user device 102. The condition can be satisfied by a witness that indicates or proves that the second user device 106 has initiated shipping of a resource using a third party that manages shipping of resources. The condition can be constructed such that the condition includes a third-party public key (e.g., a resource shipper public key).

During the interaction, the second user device 106, after receiving the interaction message from the first user device 102, can communicate with a third party (e.g., a third party that manages shipping of resources) to initiate shipping of a resources to the first user device 102. The third party can ship the resources and then generate an indication that the resource has been shipped (e.g., a shipping label). The third party can sign the indication that the resource has been shipped with a third-party private key that corresponds to the third-party public key. The third party can provide the signed indication that the resource has been shipped to the second user device 106. The second user device 106 can utilize the signed indication that the resource has been shipped as a witness for the interaction.

To verify that the witness satisfies the condition, the first user device 102 and the second user device 106 can input the witness (e.g., the signed indication that the resource has been shipped) into the condition. The condition, which includes the third party public key, can verify the signature on the indication that the resource has been shipped using the third party public key. If the signature is valid, the condition can output a value of 1, which indicates that the witness satisfies the condition.

TABLE 2

| Conditional offline interaction method<br>Conditional Offline Interaction Protocol |
|---|
| A user device B requests a user device A to send it x amount while both are offline from a server S. Both the user device A and the user device B agree on a condition $\phi$ and an expiry time t. |
| 1. If B ∈ S.TARegistry, then it sets receiverCert ← $T_B$.cert. Otherwise, receiverCert ← $cert_B$. Then, B sends [RequestPayment, receiverCert] to A. |
| 2. Upon receiving [RequestPayment, receiverCert] from B, client A sends P ← $T_A$.ConditionalPay(x, receiverCert, $\phi$, t) to B. |
| 3. Upon receiving P from A, client B aborts if ConditionalPayVerify(P, receiverCert, $\phi$, t) ≠ 1 or P ∈ B.inPaymentLog, else B adds P to B.inPaymentLog and sends [ReceivedPayment, P, w] to A. |
| 4. Upon receiving [ReceivedPayment, P, w] from B before the expiry time t, client A sends σ ← TA.EnableCollectPayment(P, w) to B. If no such message was received before time t, then client A engages in the conditional payment reversal protocol in Table 7 with the server S to reverse the conditional payment. |
| 5. If B ∈ S.TARegistry and B did not receive σ from A in step 4 before the expiry time t, then client B engages in the appeal conditional claim protocol in Table 6 with the server S to claim the conditional payment. |

TABLE 3

| Various conditional interaction trusted application functions |
|---|
| ConditionalPay(x, receiverCert, ϕ, t): |
| 1. Abort if t < now;<br>2. P ← Pay(x, receiverCert);<br>3. Abort if P = ⊥;<br>4. P .type ← "Conditional"; P .condition ← ϕ; P .expiry ← t;<br>5. Update P.sig ← Sign([P.amount, P.senderCert, P. receiverCert, P.index,P.condition, P.expiry], T.sk).<br>6. Append (P, 0) to T.outPaymentLog and output P. |
| Pay(x, receiverCert):s |
| 1. 1.Abort if T.cert = 0 or T.bal < x;<br>2. 2.T.bal ← T.bal − x;<br>3. 3. T.j ←Tj + 1;<br>4. 4. P.amount ← x ; P.senderCert ← T.cert; P.receiverCert ← receiverCert; P. index ← T.j;<br>5. 5.Output P, where P.sig ← Sign([P.amount, P.senderCert, P.receiverCert, P.index], T.sk). |
| EnableCollectPayment(P, w): |
| 6. Abort if (P, 0) ϵ T.outPaymentLog or P .condition(w) ≠ 1 or now > P.expiry<br>7. Update T.outPaymentLog ← (T.outPaymentLog\(P, O)})U{(P, 1)}, and output σ ← Sign((P, w), T.sk).<br>ConditionalCollect(P, ϕ, t, w, σ):<br>1. Abort if P .condition ≠ ϕ d or if P.expiry ≠ t;<br>2. Abort if P .condition(w) ≠ 1 or if SigVerify(w, σ, P .senderCert.vk) ≠ 1;<br>3. Collect(P). |
| AppealConditionalPayment(r, P): |
| 1. Output ⊥ if T.cert = ϕ or [T.inPaymentLog, r, P, σ], where σ = Sign([T.inPaymentLog, r, P], T.sk).<br>2. Update T.inPaymentLog ← T.inPaymentLog u {P}. |
| Get-OutPaymentLog(r ): |
| 1. Output ⊥ if T.cert = ϕ or [T.outPaymentLog, r, σ], where σ = Sign([T.outPaymentLog, r], T.sk). |

Figure 5:
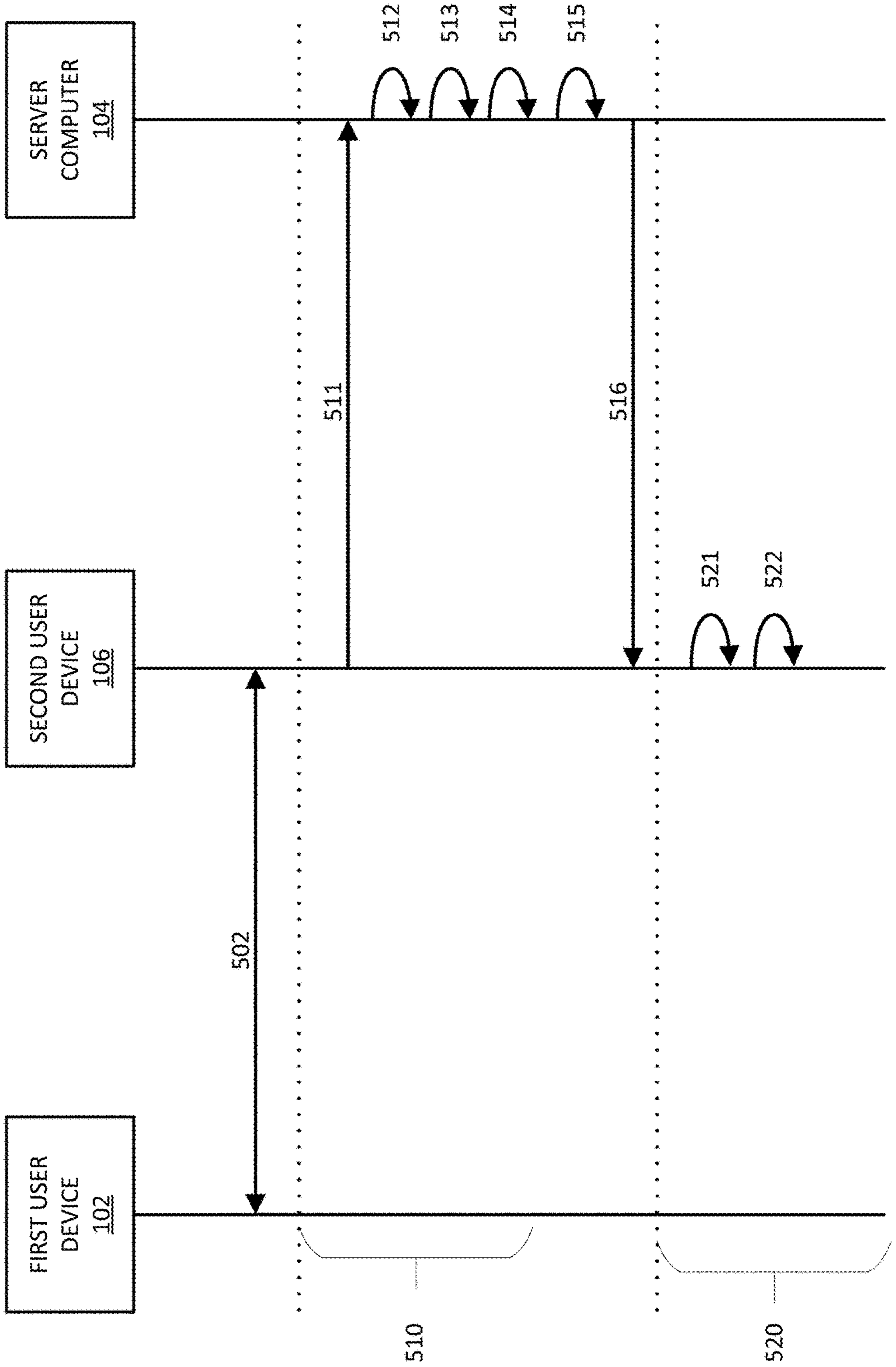
FIG. 5 shows a flow diagram illustrating claim and collection methods according to embodiments.

FIG. 5 shows a flow diagram illustrating claim and collection methods according to embodiments. The claim method 510 illustrated in FIG. 5 will be described in the context of a conditional payment claim to add the amount to the second user's online balance held by a server. The collection method 520 illustrated in FIG. 5 will be described in the context of a conditional payment collection to add the amount to the second user's offline balance held by a secure element installed on the second user device. It is understood, however, that the invention can be applied to other circumstances. The method illustrated in FIG. 5 can be performed by a first user device 102, a second user device 106, and a server computer 104. The claim method 510 illustrated in FIG. 5 is also illustrated in Table 5, below.

At step 502, the first user device 102 and the second user device 106 can perform a conditional interaction as described in FIG. 3. At the end of step 502, the second user device 106 can receive a signed witness. The signed witness can allow the second use device 106 to access the amount as indicated in the interaction.

After receiving the signed witness, the second user device 106 can perform the claim method 510 or the collection method 520. The claim method 510 can allow the second user device 106 to communicate with the server computer 104 to add the amount to an online amount maintained by the server computer 104. The collection method 520 can allow the second user device 106 to add the amount to an offline amount maintained by a secure element included in the second user device 106.

At step 511, during the claim method 510, the second user device 106 can provide the interaction message and the witness to the server computer 104 before the expiry time. The second user device 106 can also provide the second user device public key to the server computer 104.

In some embodiments, before, after, or while providing the witness to the first user device 102, the second user device 106 can provide the interaction message and the witness to the server computer 104 before the expiry time.

At step 512, after receiving the interaction message and the witness, the server computer 104 can verify the identity of the second user device.

The server computer 104 can compare the second user device public key received from the second user device 106 to the second user device public key included in the receiver certificate (e.g., the second user device certificate) included in the interaction message. If the two different instances of the second user device public key do not match, then the server computer 104 can determine that the current claim request is fraudulent or incorrect. In such a case, the server computer 104 can deny the request received from the second user device 106.

The server computer 104 can determine whether or not the second user device 106 is registered in the conditional offline interaction system. For example, the server computer 104 can evaluate client registry, or other suitable database comprising a plurality of device public keys, for the second user device public key. If the second user device 106 previously enrolled in the conditional offline interaction system, then the second user device public key will be included in the client registry. If the server computer 104 determines that the client registry does not include the second user device public key, then the server computer 104 can deny the request received from the second user device 106.

The server computer 104 can determine whether or not the second user device public key is included in a secure element or trusted application registry (e.g., a TARegistry). If the second user device public key is included in the secure element or trusted application registry, then the server computer 104 can deny the request received from the second user device 106. The server computer 104 can deny the request because the second user device 106 provided a secure element or trusted application public key to the server computer 104 rather than the second user device public key.

At step 513, after verifying the identity of the second user device, the server computer 104 can verify the interaction message. For example, the server computer 104 can verify that ConditionalPayVerify (P, P.receiverCert, P.condition, P.expiry)=1).

To verify the interaction message, the server computer 104 can verify that the witness satisfies the condition included in the interaction message. For example, the server computer 104 can input the witness into the condition to determine an output value. If the output value is equal to a value of 1, then the server computer 104 can continue to verify the interaction message. If the output value is not equal to a value of 1, then the server computer 104 can deny the request received from the second user device 106.

The server computer 104 can further verify the interaction message by evaluating the expiry time included in the interaction message. If the expiry time has not yet occurred, then the server computer 104 can continue to verify the interaction message. If the expiry time has already passed (e.g., P:expiry<now) then the server computer 104 can deny the request received from the second user device 106.

The server computer 104 can further verify the interaction message by verifying that a type indicator include in the interaction message is equal to a type of "conditional." If the type is not "conditional," then the server computer 104 can deny the request received from the second user device 106.

In some embodiments, the server computer 104 can further verify the interaction message by comparing a second user device certificate received from the second user device 106 to the receiver certificate included in the interaction message. If the received second user device certificate matches the receiver certificate, then the server computer 104 can continue to verify the interaction message. If the certificates do not match, then the server computer 104 can deny the request received from the second user device 106.

The server computer 104 can further verify the interaction message by verifying the signature included in the interaction message. The server computer 104 can verify the signature using the first user device public key included in the sender certificate included in the interaction message. For example, the server computer 104 can perform SigVerify (P.Payload, P.sig, P.senderCert.vk)=1, where P.Payload=[P.amount, P.senderCert, P.receiverCert, P.index, P.condition, P.expiry]. If the signature is valid, then the server computer 104 can continue to step 514. If the signature is not valid, then the server computer 104 can deny the request received from the second user device 106.

At step 514, after evaluating the interaction message, the server computer 104 can adjust an online balance for the second user device 106. The server computer 104 can add the amount, which is included in the interaction message, to an initial second user device online balance to determine a final second user device online balance. For example, the server computer 104 can perform onlineBal+=x_amount.

In some embodiments, the server computer 104 can add the interaction message to an interaction message log. When evaluating the interaction message, the server computer 104 can determine whether or not the interaction message was previously received and correctly executed by searching the interaction message log for the interaction message to prevent duplicating the effects of the interaction message.

At step 515, the server computer 104 can generate a response message that indicates whether or not the interaction message was successfully evaluated and the amount added to the online balance.

At step 516, the server computer 104 can provide the response message to the second user device 106.

TABLE 4

| Conditional interaction verification functions |
|---|
| ConditionalPayVerify(P, receiverCert, $\phi$, t): |
| Return 1 if and only if all of the following conditions hold:<br>1. P.condition = $\phi$, P.expiry = t,<br>2. P.condition(w) = 1,<br>3. P.expiry > now,<br>4. P.type = "conditional",<br>5. P.receiverCert = receiverCert,<br>6. TACertVerify(P .senderCert) = 1, and<br>7. SigVerify(P.Payload, P.sig, P.senderCert.vk) = 1, where P.Payload = [P.amount, P.senderCert, P.receiverCert, P.index, P.condition, P.expiry]. |
| ConditionalPayReversalVerify(P): |
| Return 1 if and only if all of the following conditions hold:<br>1. P.expiry < now,<br>2. P.type = "conditional",<br>3. TACertVerify(P .senderCert) = 1, and<br>4. SigVerify(P.Payload, P.sig, P.senderCert.vk) = 1, where P.Payload = [P.amount, P.senderCert, P.receiverCert, P.index, P.condition, P.expiry]. |

TABLE 5

| Conditional claim method (Offline-to-Online) |
|---|
| Conditional Claim Protocol (Offline Conditional Payment = Online Balance)<br>User device B submits an offline conditional payment P that it received from user device A to server S to have the money credited into user device B's online balance stored at S.<br>1. B sends [Claim, P, w] to S.<br>2. Upon receiving [Claim, P, w] from B, server S performs the following steps:<br>a) Abort if any of the following is true.<br>i) P.receiverCert. vk $\neq$ vkB;<br>ii) $vk_B \notin$ S.clientRegistry;<br>iii) (vkB,•) $\in$ S.TARegistry;<br>iv) ConditionalPayVerify(P, P.receiverCert, P.condition, P.expiry) $\neq$ 1<br>v) P $\in$ S.paymentLog; |

TABLE 5-continued

| Conditional claim method (Offline-to-Online) |
|---|
| b) S.onBalB ← S.onBalB + P .amount;<br>c) Add P to S.paymentLog.<br>d) Send [ClaimConfirmed] to B. |

In other embodiments, the second user device 106 can perform the collect method 520 after receiving the signed witness. At step 521 the second user device 106 can verify the interaction message.

The second user device 106 can verify the interaction message by verifying that the condition included in the interaction message matches the original condition. Similarly, the second user device 106 can verify that the expiry time included in the interaction messages matches the original expiry time. As such, the second user device 106 can determine if the first user device 102 has maliciously attempted to alter the condition or expiry time.

The second user device 106 can further verify the interaction message by verifying that the witness satisfies the condition. The second user device 106 can verify that the witness satisfies the condition as described in detail herein.

The second user device 106 can further verify the interaction message by verifying the signature on the witness. The second user device 106 can verify the signature on the witness using the first user device public key included in the sender certificate included in the interaction message.

At step 522, after verifying the interaction message, the second user device 106 can collect the amount included in the interaction message into a secure element or trusted application included in the second user device 106.

The secure element or trusted application can verify the interaction message prior to modifying an offline balance maintained by the secure element or trusted application. For example, the secure element or trusted application can verify that the receiver certificate included in the interaction message matches the second user device certificate. The secure element or trusted application can also verify that the sender certificate included in the interaction message is a valid certificate. The secure element or trusted application can also verify the signature included in the interaction message using the first user device public key included in the sender certificate included in the interaction message.

The secure element or trusted application can evaluate whether or not the interaction message is included in an interaction log maintained by the secure element or trusted application. The secure element or trusted application can deny the collection of the amount if the interaction message is already included in the interaction log.

After verifying the interaction message, the secure element or trusted application can modify the offline balance maintained by the secure element or trusted application using the amount included in the interaction message. For example, the secure element or trusted application can increase the stored offline balance by the amount.

The secure element or trusted application can add the interaction message to the interaction message log, to indicate that the interaction message has been processed.

Figure 6:
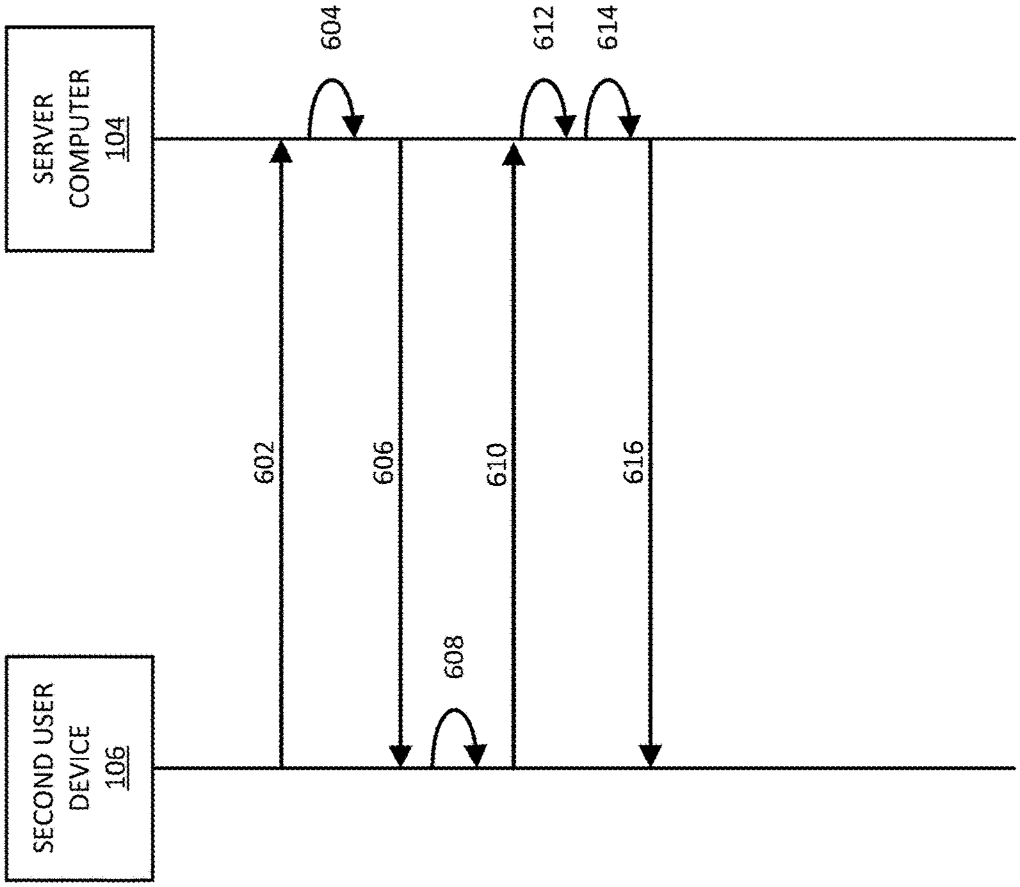
FIG. 6 shows a flow diagram illustrating a conditional appeal method according to embodiments.

FIG. 6 shows a flow diagram illustrating a conditional appeal method according to embodiments. The method illustrated in FIG. 6 will be described in the context of a conditional collection appeal process if the first user device 102 does not allow the second user device 106 to collect the payment after receiving a witness that satisfies the condition. It is understood, however, that the invention can be applied to other circumstances. The method illustrated in FIG. 6 can be performed by the second user device 106 and the server computer 104. The method illustrated in FIG. 6 is also illustrated in Table 6, below.

After providing the witness to the first user device 102 (in FIG. 3), the second user device 106 can expect to receive a signed witness (e.g., in an enable collection message) from the first user device 102. However, if the first user and/or the first user device 102 acts maliciously, or otherwise becomes unavailable (out of range, broken, etc.), then the second user device can appeal the interaction to the server computer 104.

For example, prior to the expiry time, the second user device 106 can perform an appeal process. The second user device 106 can transmit information to the server computer 104 to initiate the appeal.

At step 602, the second user device 106 can provide an appeal request message that includes an indication to the server computer 104 that indicates that the first user device 102 has not properly provided the signed witness.

At step 604, after receiving the appeal request message, the server computer 104 can obtain a random nonce (e.g., $r \leftarrow \{0, 1\}^{\lambda}$). For example, the server computer 104 can generate the random nonce or retrieve the random nonce from a precomputed queue of random nonces.

At step 606, the server computer 104 can provide the random nonce to the second user device 106.

At step 608, after receiving the random nonce, the second user device 106 can generate an appeal interaction message. The appeal interaction message can include the interaction message and the witness. If the second user device 106 includes a secure element or trusted application, the appeal interaction message can further include an interaction log maintained by the secure element or trusted application. The appeal interaction message can also include the random nonce.

In some embodiments, at step 608, if the second user device 106 includes a secure element or trusted application, the second user device 106 can generate a log entry (TA-Log). The second user device 106 can include the log entry in the appeal interaction message.

The secure element of the second user device 106 can generate the log entry. For example, the secure element can verify that there is a secure element certificate present in the secure element (e.g., the secure element can output $\perp$ if T.cert=$\emptyset$). The secure element can verify that the interaction log maintained by the secure element does not already include the current interaction message that is signed by the secure element (e.g., [T.inPaymentLog, r, P, $\sigma$], where $\sigma$=Sign ([T.inPaymentLog, r, P], T.sk)). The secure element can sign the interaction message with a secure element private key and add the signed interaction message to the interaction log.

At step 610, after generating the appeal interaction message, the second user device 106 can provide the appeal interaction message to the server computer 104.

At step 612, after receiving the appeal interaction message, the server computer 104 can evaluate the witness and the interaction message. For example, the server computer 104 can verify that a second user device public key, which is included in the receiver certificate in the interaction message, is included in a client registry database. As such, the server computer 104 can verify that the second user device 106 is registered with the server computer 104.

The server computer 104 can also verify that a public key of the first secure element of the first user device, which is included in the sender certificate in the interaction message, is included in a secure element registry database. As such, the server computer 104 can verify that the first user device 102 is registered with the server computer 104.

The server computer 104 can also verify that the witness satisfies the condition and that the witness was received prior to the expiry time, as described in detail herein.

The server computer 104 can also verify the certificates (e.g., the sender certificate and the receiver certificate) included in the interaction message.

The server computer 104 can also verify that an interaction log maintained by the server computer 104 does not already include the interaction message.

The server computer 104 can also verify the log entry (TALog). To verify the log entry, the server computer 104 can determine whether or not the random nonce generated during step 604 matches the random nonce included in the log entry by the second user device 106. If the random nonces do not match, then the server computer 104 can deny the appeal request.

The server computer can further verify the log entry by determining whether or not the interaction message included in the log entry matches the interaction message included in the appeal request message. If the interaction messages do not match, then the server computer 104 can deny the appeal request.

The server computer can further verify the log entry by verifying the signature included in the log entry using the second user device public key included in the receiver certificate included in the interaction message.

At step 614, after verifying the information provided by the server computer 104, if the information is valid, the server computer 104 can modify a second user device online balance using the amount included in the interaction message. For example, the server computer 104 can increase the second user device online balance by the amount. After modifying the second user device online balance, the server computer 104 can add the interaction message to an interaction message log.

At step 616, the server computer 104 can provide an appeal response message that indicates whether or not the appeal was successful to the second user device 106.

TABLE 6

| Appeal conditional claim method (Offline-to-Online)<br>Appeal Conditional Claim Protocol (Offline Conditional Payment $\Rightarrow$ Offline Balance) |
|---|
| User device B submits an appeal for an offline conditional payment P that it received from user device A to server S to have the credited into user device B's offline balance stored at S.<br>1. Server S samples a random nonce $r \leftarrow \{0, 1\}^{\lambda}$ and sends r to B.<br>2. B sets TALog $\leftarrow T_B$.AppealConditionalPayment(r, P). Then, B sends [AppealPayment, P, w, TALog] to server S.<br>3. Upon receiving [AppealPayment, P, w, TALog] from B, server S performs the following steps:<br>a) Abort if any of the following is true.<br>i) $vk_B \notin$ S.clientRegistry;<br>ii) ($vk_B$, P.receiverCert.vk) $\notin$ S.TARegistry;<br>iii) ConditionalPayVerify(P, P. receiverCert, P.condition, P.expiry) $\neq 1$<br>iv) P $\in$ S.paymentLog;<br>b) Parse TALog as (inPaymentLog, r', P', $\sigma$). Abort if any of the following is true.<br>v) $r \neq r'$<br>vi) $P \neq P'$<br>vii) SigVerify([inPaymentLog, r, P], o, P.receiverCert.vk) $\neq 1$<br>viii) P $\in$ inPaymentLog<br>c) S.onBalB $\leftarrow$ S.onBalB + P.amount;<br>d) Add P to S.paymentLog.<br>e) Send [AppealConfirmed] to B. |

FIG. 7 shows a flow diagram illustrating a conditional reversal method according to embodiments. The method illustrated in FIG. 7 will be described in the context of a conditional payment reversal for when the first user device 102 does not receive a witness or a satisfactory witness from the second user device 106. It is understood, however, that the invention can be applied to other circumstances. The method illustrated in FIG. 7 can be performed by the first user device 102 and a server computer 104. The method illustrated in FIG. 7 is also illustrated in Table 7, below.

During the method shown in FIG. 3, the first user device 102 expects to receive the witness that satisfies the condition from the second user device 106. However, the first user device 102 may not receive the witness from the second user device 106. If the first user device 102 does not receive the witness, then the first user device 102 can communicate with the server computer 104 to reverse the interaction to re-obtain the amount included in the interaction message.

At step 702, the first user device 102 can generate a reverse interaction request message that indicates that no witness was received from the second user device 106. The first user device 102 can provide the reverse interaction request message to the server computer 104.

At step 704, after receiving the reverse interaction request message, the server computer 104 can obtain a random nonce.

At step 706, the server computer 104 can provide the random nonce to the first user device 102.

At step 708, after receiving the random nonce, the first user device 102 can generate a reverse interaction message. The reverse interaction message can include the interaction message and a log entry.

The log entry can be generated by a secure element or trusted application included in the first user device 102. The secure element of the first user device 102 can generate the log entry. For example, the secure element can verify that there is a secure element certificate present in the secure element (e.g., the secure element can output ⊥ if T.cert=∅). The secure element can verify that the interaction log maintained by the secure element does not already include the current interaction message that is signed by the secure element (e.g., [T.inPaymentLog, r, P, σ], where σ=Sign ([T.inPaymentLog, r, P], T.sk)). The secure element can sign the interaction message with a secure element private key and add the signed interaction message to the interaction log.

At step 710, the first user device 102 can provide the reverse payment message to the server computer 104 once the current time matches or exceeds the expiry time.

At step 712, after receiving the reverse payment message, the server computer 104 can evaluate the witness and the interaction message. For example, the server computer 104 can verify that a first user device public key, which is included in the receiver certificate in the interaction message, is included in a client registry database. As such, the server computer 104 can verify that the first user device 102 is registered with the server computer 104.

The server computer 104 can also verify that a public key of the first secure element of the first user device 102, which is included in the sender certificate in the interaction message, is included in a secure element registry database. As such, the server computer 104 can verify that the first user device 102 secure element is registered with the server computer 104.

The server computer 104 can also verify that the current time is greater than the expiry time.

The server computer 104 can also verify the certificates (e.g., the sender certificate and the receiver certificate) included in the interaction message.

The server computer 104 can also verify that an interaction log maintained by the server computer 104 does not already include the interaction message.

The server computer 104 can also verify the log entry (TALog). To verify the log entry, the server computer 104 can determine whether or not the random nonce generated during step 702 matches the random nonce included in the log entry by the first user device 102. If the random nonces do not match, then the server computer 104 can deny the appeal request.

The server computer can further verify the log entry by verifying the signature included in the log entry using the second user device public key included in the receiver certificate included in the interaction message.

At step 714, after verifying the information provided by the server computer 104, if the information is valid, the server computer 104 can modify a first user device online balance using the amount included in the interaction message. For example, the server computer 104 can increase the first user device online balance by the amount. After modifying the first user device online balance, the server computer 104 can add the interaction message to an interaction message log.

At step 716, the server computer 104 can provide an appeal response message that indicates whether or not the appeal was successful to the first user device 102.

TABLE 7

| Conditional interaction reversal method (Offline-to-Online) Conditional Payment Reversal Protocol (Offline Conditional Payment ⇒ Online Balance) |
|---|
| A user device A submits a request for the reversal of an offline conditional payment P that it sent to a user device B to a server S to money credited into user device A's online balance stored at the server S.<br>1. Server S samples a random nonce r ← $\{0, 1\}^\lambda$ and sends r to A.<br>2. A sets TALog ← $T_A$.Get-OutPaymentLog(r). Then, A sends [ReversePayment, P, TALog] to server S.<br>3. Upon receiving [ReversePayment, P, TALog] from A, server S performs the following steps:<br>a) Abort if any of the following is true.<br>i) $vk_A \notin$ S.clientRegistry;<br>ii) ($vk_A$, P.senderCert.vk) ∉ S.TARegistry;<br>iii) ConditionalPayReversalVerify(P) ≠ 1<br>iv) P ∈ S.paymentLog;<br>b) Parse TALog as (outPaymentLog, r', σ). Abort if any of the following is true.<br>v) r ≠ r'<br>vi) SigVerify([outPaymentLog, r], σ, P.senderCert.vk) ≠ 1<br>vii) (P, 0) ∉ outPaymentLog<br>c) S.onBalA ← S.onBalA + P.amount;<br>d) Add P to S.paymentLog.<br>e) Send [ReversalConfirmed] to A. |

Embodiments of the disclosure have several advantages. Embodiments provide for technical solutions to the following technical problems, for example, in offline transactions: 1) how do the devices determine that the interaction is complete?; 2) how does the sender device re-obtain their amount if the interaction is not complete?; and 3) how does the receiver device obtain the amount if the sender device acts maliciously?.

With regard to 1), the use of the witnesses and conditions described above can ensure that interactions can be verifiably completed between two offline user devices. With regard to 2), the above-described reversal process can ensure that a sender can re-obtain any transferred amounts, such as in the case where a witness is not received by the sender device of a sender (e.g., the first user device of the first user). With regard to 3), the above-described appeal process can be used by a receiver of a receiver device to obtain any funds that are due to them (e.g., in the case where a sender device or first user device does not provide a signed witness back to the receiver device or second user device, even though the receiver or second user satisfied any agreed upon conditions with verifiable witness).

Typically, a third party is needed to verify conditions between to user devices. Embodiments provide for a secure method to allow offline interactions to occur based on conditions. However, embodiments, provide for the advantage of offline conditional interactions that do not require a third party to process the base interaction between devices.

Additional details regarding an offline interaction system can be found in International Application No. PCT/US2021/042645 filed on Jul. 21, 2021, which is incorporated herein for all purposes.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a server computer from a second user device, an interaction message comprising an amount and a condition, and a witness, wherein the witness is digitally signed with a cryptographic key to form a witness digital signature;

verifying, by the server computer, an identity of the second user device;

verifying, by the server computer, the interaction message by determining that the witness satisfies the condition and verifying the witness digital signature using a public key of a first user device that interacted with the second user device;

responsive to verifying the interaction message, adjusting, by the server computer, an online balance for the second user device;

generating, by the server computer, a response message that indicates that the interaction message was successfully evaluated and the amount was added to the online balance; and transmitting, by the server computer, the response message to the second user device.

2. The method of claim 1, wherein the interaction message further comprises an expiry time, and wherein verifying the interaction message further comprises determining that the expiry time has not yet occurred.

3. The method of claim 1, wherein the interaction message further comprises a receiver certificate, and wherein verifying the interaction message further comprises determining that the receiver certificate matches a second user device certificate received from the second user device.

4. The method of claim 1, wherein the amount is an amount of digital currency.

5. The method of claim 4, wherein the first user device transmitted the interaction message to the second user device before the interaction message is received by the server computer.

6. The method of claim 5, wherein the first user device is a first mobile phone and the second user device is a second mobile phone.

7. The method of claim 5, wherein the interaction message further comprises an index, the index being a number of interactions performed using the first user device.

8. The method of claim 5, wherein the cryptographic key is a first user device private key.

9. The method of claim 8, wherein the witness is digitally signed using the first user device private key in a secure element on the first user device.

10. The method of claim 8, wherein the first user device and the second user device interacted with each other in an offline manner when the first user device transmitted the interaction message to the second user device.

11. A method comprising:

receiving, by a server computer from a second user device, an appeal request message comprising an indication that a first user device has not properly provided a signed witness and requests an appeal of an interaction involving the first user device, the second user device and an interaction message comprising an amount and a condition;

responsive to receiving the appeal request message, determining, by the server computer, a random nonce;

transmitting, by the server computer to the second user device, the random nonce;

receiving, by the server computer from the second user device, an appeal interaction message comprising the interaction message, a witness, and the random nonce;

evaluating, by the server computer, the interaction message and the witness, wherein the witness is cryptographically verified using a second user device public key; and providing, by the server computer to the second user device, an appeal interaction response message comprising an indication of whether or not the appeal was successful.

12. The method of claim 11, wherein the appeal was successful and the method further comprises:

modifying a second user device online balance according to the amount.

13. The method of claim 11, wherein the interaction message further comprises an index, the index being a number of interactions performed using the first user device.

14. The method of claim 11, wherein the interaction message further comprises an expiry time, and wherein evaluating the interaction message further comprises:

determining that the expiry time has not yet occurred.

15. The method of claim 11, wherein the interaction is an offline interaction between the first user device and the second user device.

16. A method comprising:

receiving, by a server computer from a first user device, a reversal interaction message to reverse an interaction between the first user device and a second user device, wherein the reversal interaction message indicates that the first user device never received a cryptographically signed witness from the second user device;

obtaining, by the server computer, a random nonce;

transmitting, by the server computer to the first user device, the random nonce;

receiving, by the server computer from the first user device, a reverse interaction message comprising an interaction message and a log entry;

evaluating, by the server computer, the interaction message and the log entry;

generating, by the server computer, an appeal response message that indicates whether or not the reversal was successful from the server computer; and transmitting, by the server computer to the first user device, the appeal response message.

17. The method of claim 16, wherein the interaction is a payment transaction.

18. The method of claim 16, wherein the interaction message comprises an expiry time, and wherein evaluating the interaction message determines that the expiry time has not yet occurred.

19. The method of claim 16, wherein the appeal response message indicates that the reversal was successful, and wherein the method further comprises:

adjusting, by the server computer, an online balance of the first user device using an amount in the interaction message.

20. The method of claim 16, wherein the interaction is an offline interaction between the first user device and the second user device.

* * * * *